(12) United States Patent
Swank et al.

(10) Patent No.: US 6,757,158 B2
(45) Date of Patent: Jun. 29, 2004

(54) IMPLOSION RESISTANT CATHODE RAY TUBE WITH MOUNTING LUG HAVING A COMPOUND BEND

(75) Inventors: Harry Robert Swank, Lancaster, PA (US); Zygmunt Marian Andrevski, Princeton, NJ (US)

(73) Assignee: Thomson Licensing S. A., Boulogne-Billancourt (FR)

( * ) Notice: Subject to any disclaimer, the term of this patent is extended or adjusted under 35 U.S.C. 154(b) by 200 days.

(21) Appl. No.: 10/179,726

(22) Filed: Jun. 25, 2002

(65) Prior Publication Data

US 2003/0235028 A1 Dec. 25, 2003

(51) Int. Cl.⁷ .............................. G06F 1/16; H04N 5/65
(52) U.S. Cl. ...................... 361/682; 348/822; 348/826; 348/836; 313/477 R; 312/223.1
(58) Field of Search ................................ 361/682, 681; 348/820–827, 836; 312/223.1, 223.2, 249.1–249.13; 313/476, 477 R

(56) References Cited

U.S. PATENT DOCUMENTS

| | | | | |
|---|---|---|---|---|
| 3,573,368 A | * | 4/1971 | Kober ......................... | 348/822 |
| 3,626,093 A | * | 12/1971 | Inglis .......................... | 348/822 |
| 4,390,809 A | * | 6/1983 | Mitchell et al. ............. | 313/482 |
| 4,651,256 A | * | 3/1987 | Yamagishi .................. | 361/682 |
| 5,270,826 A | * | 12/1993 | Fowler ........................ | 348/822 |
| 5,466,984 A | * | 11/1995 | Gotoh ...................... | 313/477 R |
| 5,844,635 A | * | 12/1998 | Kim ............................ | 348/826 |
| 6,124,901 A | * | 9/2000 | Diven et al. ................ | 348/822 |
| 6,417,893 B1 | * | 7/2002 | Heirich et al. ............. | 348/822 |
| 6,437,838 B1 | * | 8/2002 | Swank et al. ............... | 348/836 |

FOREIGN PATENT DOCUMENTS

WO   WO 02/061796 A1   8/2002   ............ H01J/29/87

OTHER PUBLICATIONS

IBM Technical Disclosure Bulletin, "Crt Mounting Method for Single Part Bezels", vol. 37, No. 1, Jan. 1994.
Japanese Patent Abstract, vol. 1999 No. 10, Aug. 31, 1999, & JP 11146303 A, May 28, 1999.

* cited by examiner

*Primary Examiner*—Lisa Lea-Edmonds
(74) *Attorney, Agent, or Firm*—Joseph S. Tripoli; Joseph J. Laks; Carlos M. Herrera

(57) ABSTRACT

A cathode ray tube having an evacuated envelope including a substantially rectangular faceplate panel with a sidewall joined to a funnel and an implosion resistant band surrounding at least a portion of the sidewall and in contact therewith. The cathode ray tube is mounted in a cabinet by a plurality of mounting lugs. The mounting lugs having a base portion attached to the implosion resistant band, an adjoining portion substantially perpendicular to the base portion, and a mounting portion positioned at an angle in respect to the adjoining portion. The mounting portion having an aperture for receiving a fastner for coupling the mounting portion to the cabinet.

11 Claims, 4 Drawing Sheets

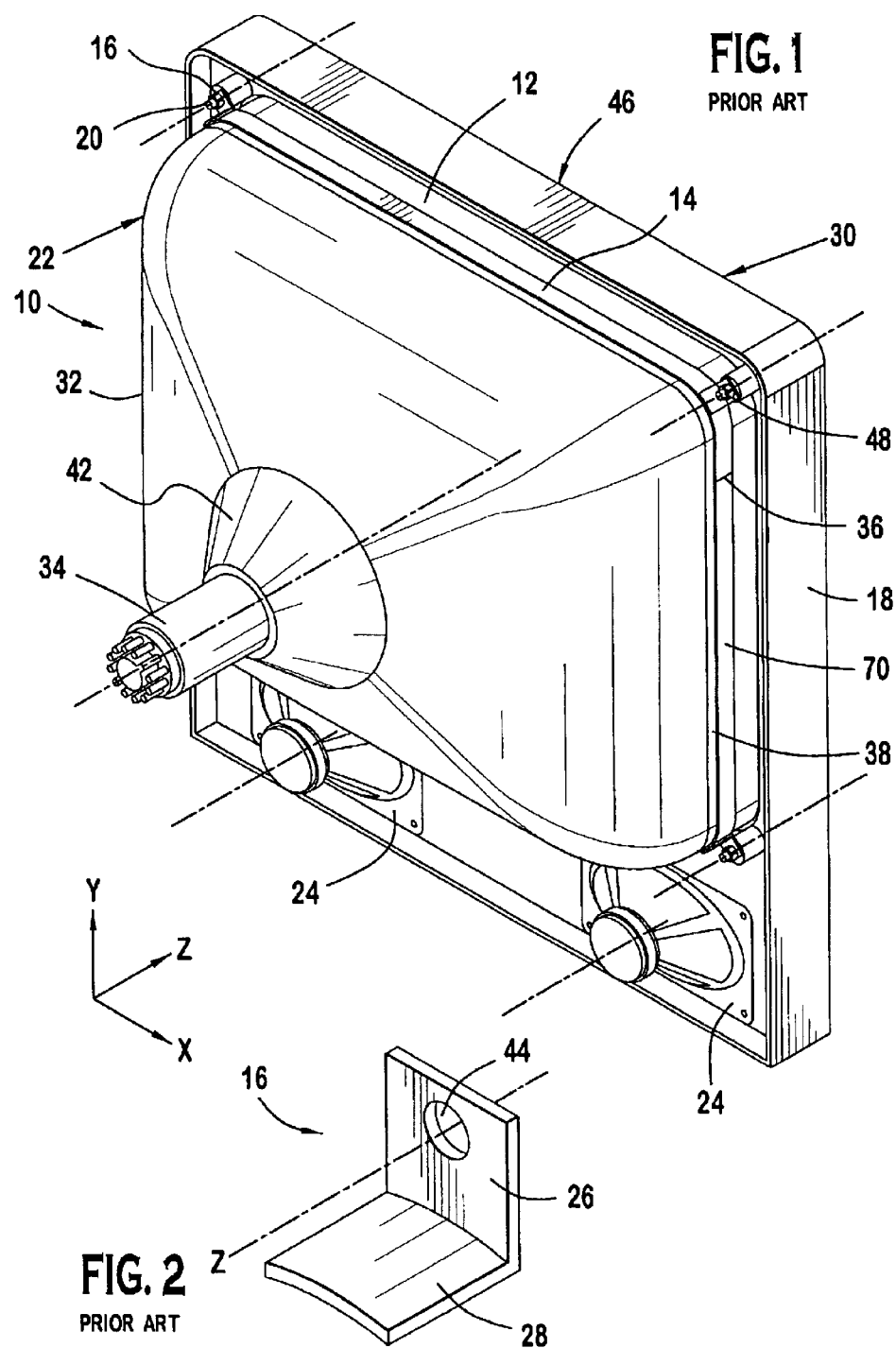

US 6,757,158 B2

IMPLOSION RESISTANT CATHODE RAY TUBE WITH MOUNTING LUG HAVING A COMPOUND BEND

FIELD OF THE INVENTION

The invention relates to cathode ray tubes (CRTs) and, more particularly, to a mounting lug for mounting the CRT to a cabinet.

BACKGROUND OF THE INVENTION

Shown in FIG. 1 is a conventional cathode ray tube 10 (CRT) having an evacuated glass envelope 32 including a substantially rectangular faceplate panel 30 and a tubular neck 34 connected by a funnel 22. An electron gun (not shown) is mounted within the tubular neck 34 and is designed to be used with an external magnetic deflection yoke 42 positioned in the vicinity of the funnel-to-neck junction. The faceplate panel 30 has a peripheral flange or sidewall 12 that is sealed to the funnel 22 by a glass frit 38.

An implosion resistant band 14 surrounds at least a portion of the sidewall 12. One type of implosion resistant band 14 is a shrink fit band formed from a steel strip that is joined at the ends by a weld 36. Before assembly, the periphery of the implosion resistant band 14 is initially slightly smaller than the periphery of the faceplate panel 30. The implosion resistant band 14 is then heated to cause it to expand to a dimension that allows it to be fitted around the sidewall 12 of the faceplate panel 30. As the implosion resistant band 14 cools, it shrinks to contact the sidewall 12 thereby applying a compressive force to the faceplate panel 30. Although an implosion resistant band 14 in the form of a shrinkfit band is illustrated, alternatively, the implosion resistant band 14 may be a conventional tension band having ends fixed by a crimped closure.

Positioned at corners of the CRT 10 are mounting lugs 16 that affix the CRT 10 within a cabinet 18 adjacent to a substantially rectangular cabinet opening 46. As shown in FIG. 2, each of the mounting lugs 16 typically has a mounting portion 26 positioned essentially perpendicular to a base portion 28. The base portion 28 of the mounting lug 16 is attached to a surface 70 of the implosion resistant band 14 by a weld. The mounting lug 16 may optionally be integral with or disposed between the implosion resistant band 14 and the sidewall 12 of the faceplate panel 30. The mounting portion 26 of the mounting lug 16 is provided with an aperture 44 to effectively couple the CRT 10 to a corresponding hole 48 in the cabinet 18 with an attachment member 20 such as a bolt, screw, etc. Because the mounting portion 26 is essentially perpendicular to the sidewall 12 of the faceplate panel 30, the CRT 10 is coupled to the cabinet 18 along a Z-axis of the CRT 10. The Z-axis is shown by the dashed lines in FIGS. 1 and 2.

The cabinet 18 includes speakers 24, as best shown in FIG. 1. Because most speakers 24 are installed to point towards the viewer, the speakers 24 are mounted in the cabinet 18 parallel to the Z-axis of the CRT 10. Microphonic action associated with the speakers 24 creates vibrations in the cabinet 18. Because the speakers 18 and the mounting lugs 16 are both mounted in the cabinet 18 along the Z-axis, vibrations along the Z-axis are coupled through the cabinet 18 to the mounting lugs 16 and finally to the CRT 10. Such microphonic vibration coupling to the CRT 10 can cause undesirable anomalies in the picture due to electron beam misregister or component shifting within the CRT 10. It is therefore desirable to develop a mounting lug 16 that will couple a CRT 10 to a cabinet along an axis other than parallel to the Z-axis to minimize microphonic vibration coupling to the CRT 10.

SUMMARY OF THE INVENTION

This invention relates to a cathode ray tube (CRT) having an evacuated envelope including a substantially rectangular faceplate panel with a sidewall joined to a funnel and an implosion resistant band surrounding at least a portion of the sidewall in contact therewith. The CRT is mounted in a cabinet by a plurality of mounting lugs. The mounting lugs include a base portion attached to the implosion resistant band, an adjoining portion substantially perpendicular to the base portion, and a mounting portion positioned at an angle in respect to the adjoining portion. The mounting portion has an aperture for receiving a fastner for coupling the mounting portion to the cabinet.

BRIEF DESCRIPTION OF THE DRAWINGS

The invention will now be described by way of example with reference to the accompanying figures, in which:

FIG. 1 is a perspective view of a CRT coupled by conventional mounting lugs to a cabinet of the prior art.

FIG. 2 is a perspective view of a conventional mounting lug of the prior art.

DETAILED DESCRIPTION OF THE INVENTION

FIGS. 3 through 8 show a first, second and third embodiment of a mounting lug 116, 216, 316, respectively. The first, second and third embodiments of the mounting lugs 116, 216, 316 will be described with reference to the cathode ray tube 10 (CRT) and the cabinet 18 of FIG. 1. It should be understood however that the CRT 10 and the cabinet 18 is modified at the mounting area to receive each of the mounting lugs 116, 216, 316.

Figure 3:
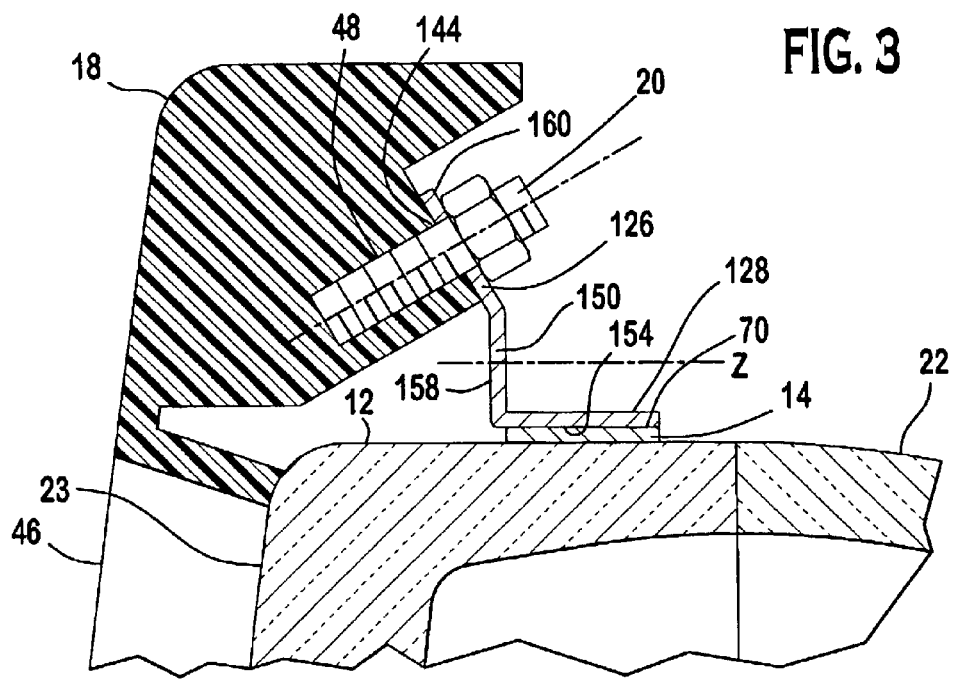
FIG. 3 is an enlarged partial cross-sectional view of the CRT showing the CRT coupled to the cabinet by a first embodiment of a mounting lug.
Figure 4:
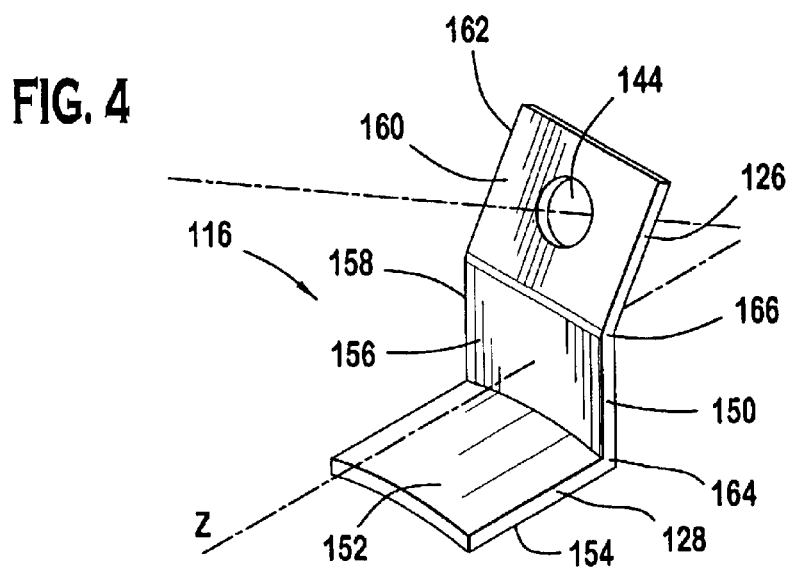
FIG. 4 is a perspective view of the first embodiment of the mounting lug.

FIGS. 3 and 4 show the first embodiment of the mounting lug 116. The first embodiment of the mounting lug 116 has a base portion 128, an adjoining portion 150 and a mounting portion 126. The base portion 128 has an outer side 152 and an inner side 154 and is positioned substantially perpendicular to a first end 164 of the adjoining portion 150. A first adjoining side 156 and a second adjoining side 158 extend from the first end 164 to a second end 166 joining the mounting portion 126. The mounting portion 126 has a fastener engaging side 160 and a cabinet engaging side 162. An aperture 144 extends from the outer side 160 through to the cabinet engaging side 162. The cabinet engaging side 162 is angled toward the second adjoining side 158 such that when the mounting portion 126 is coupled to the cabinet 18, the mounting portion 126 is positioned in an off axis plane between the Z-axis and the Y-axis of the CRT 10.

Attachment of the mounting lug 116 to the cabinet 18 will now be described in greater detail with reference to FIG. 3. Substantially at corners of the faceplate panel 30, the inner side 154 of the base portion 128 is positioned adjacent to the surface 70 of the implosion resistant band 14 such that the second adjoining side 158 is positioned toward the cabinet opening 46 and the aperture 144 will be positioned adjacent to the corresponding hole 48 in the cabinet 18. The base portion 128 is then attached to the surface 70 of the implosion resistant band 14 by a weld (not shown). Alternatively, the base portion 128 could be positioned under the surface 70 such that the outer side 152 engages the implosion resistant band 14. A fastening means 20 such as a bolt, screw, etc. is inserted into the aperture 144 and is received in the cabinet 18 to couple the CRT 10 to the cabinet 18 in an off axis plane between the Z-axis and Y-axis of the CRT 10.

Figure 5:
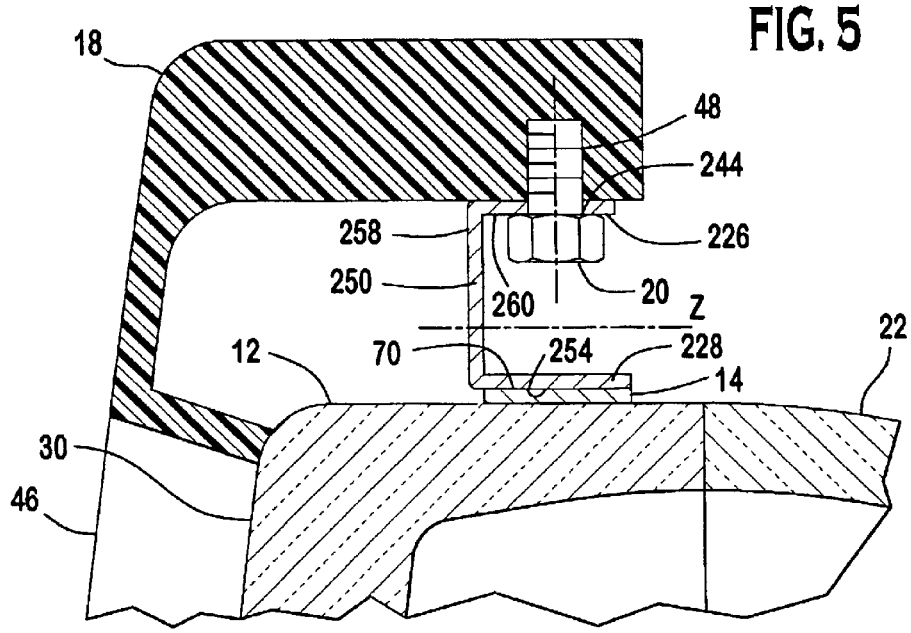
FIG. 5 is an enlarged partial cross-sectional view of the CRT showing the CRT coupled to the cabinet by a second embodiment of the mounting lug.
Figure 6:
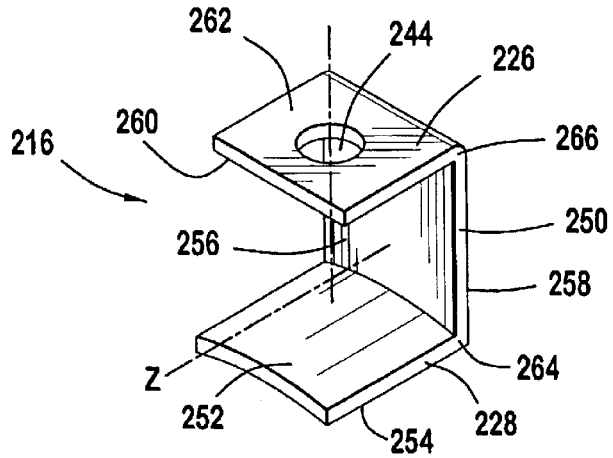
FIG. 6 is a perspective view of the second embodiment of the mounting lug.

FIGS. 5 and 6 show the second embodiment of the mounting lug 216. The second embodiment of the mounting lug 216 has a base portion 228, an adjoining portion 250 and a mounting portion 226. The base portion 228 has an outer side 252 and an inner side 254 and is positioned substantially perpendicular to a first end 264 of the adjoining portion 250. A first adjoining side 256 and a second adjoining side 258 extend from the first end 264 to a second end 266 which is positioned substantially perpendicular to the mounting portion 226. The mounting portion 226 has a fastener engaging side 260 and a cabinet engaging side 262. An aperture 244 extends from the fastener engaging side 260 through to the cabinet engaging side 262. The fastener engaging side 260 is substantially parallel to the outer side 252 such that when the mounting portion 226 is coupled to the cabinet 18, the mounting portion 226 is positioned along the Y-axis of the CRT 10.

Attachment of the mounting lug 216 to the cabinet 18 will now be described in greater detail with reference to FIG. 5. Substantially at corners of the faceplate panel 30, the inner side 254 of the base portion 228 is positioned adjacent to the surface 70 of the implosion resistant band 14 such that the second adjoining side 258 is positioned toward the cabinet opening 46 and the aperture 244 will be positioned adjacent to the corresponding hole 48 in the cabinet 18. The base portion 228 is then attached to the surface 70 of the implosion resistant band 14 by a weld (not shown). Alternatively, the base portion 128 could be positioned under the surface 70 such that the outer side 252 engages the implosion resistant band 14. A fastening means 20 such as a bolt, screw, etc. is inserted into the aperture 244 and is received in the cabinet 18 to couple the CRT 10 to the cabinet 18 along the Y-axis of the CRT.

Figure 7:
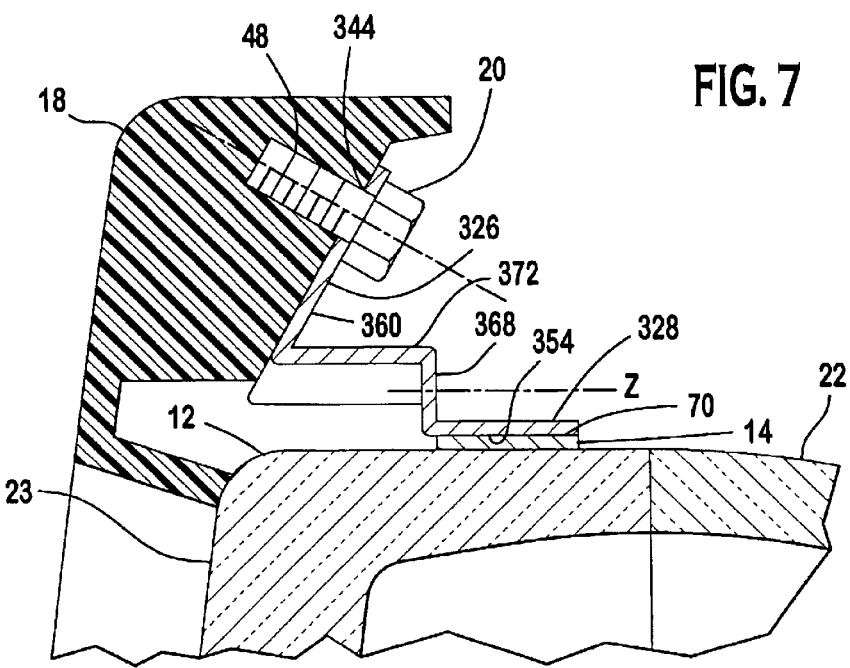
FIG. 7 is an enlarged partial cross-sectional view of the CRT showing the CRT coupled to the cabinet by a third embodiment of the mounting lug.
Figure 8:
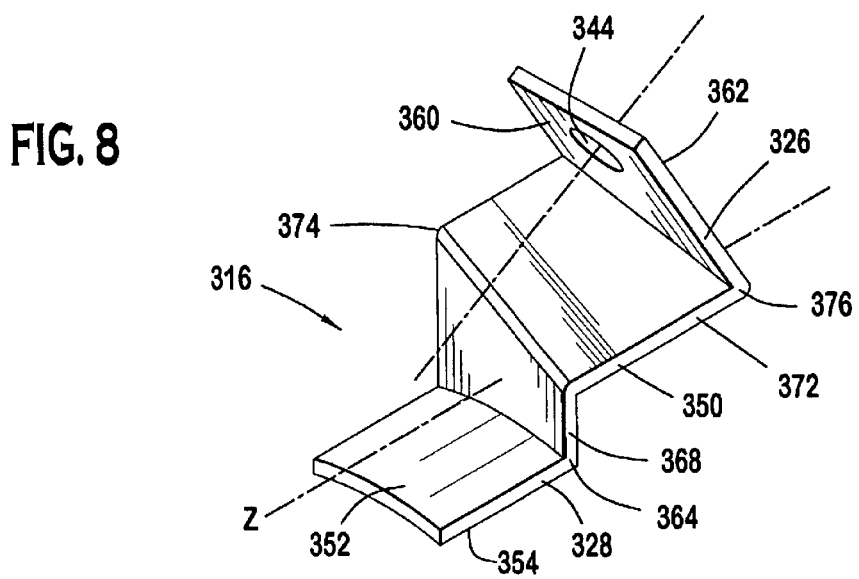
FIG. 8 is a perspective view of the third embodiment of the mounting lug.

FIGS. 7 and 8 show the third embodiment of the mounting lug 316. The third embodiment of the mounting lug 316 has a base portion 328, an adjoining portion 350 and a mounting portion 326. The base portion 328 has an outer side 352 and an inner side 354. The adjoining portion 350 is formed of two sections 368, 372. The first section 368 extends from a first end 364 substantially perpendicular to the base portion 328. The second section 372 forms a surface that has complementary ends angled 374, 376. The mounting portion 326 extends from the angled end 376 and has a fastener engaging side 360 and a cabinet engaging side 362. The cabinet engaging side 362 is angled back toward the adjoining portion 350 such that when the mounting portion 326 is coupled to the cabinet 18, the mounting portion 326 is positioned in an off axis plane between the Z-axis and the Y-axis of the CRT 10. The mounting portion 326 is provided with an aperture 344 that extends from the fastener engaging side 360 through to the cabinet engaging side 362.

Attachment of the mounting lug 316 to the cabinet 18 will now be described in greater detail with reference to FIG. 7. Substantially at corners of the faceplate panel 30, the inner side 354 of the base portion 328 is positioned adjacent to the surface 70 of the implosion resistant band 14 such that the second adjoining side 358 of the first section 368 is positioned toward the cabinet opening 46 and the aperture 344 is positioned adjacent to the corresponding hole 48 in the cabinet 18. The base portion 328 is then attached to the surface 70 of the implosion resistant band 14 by a weld (not shown). Alternatively, the base portion 128 could be positioned under the surface 70 such that the outer side 352 engages the implosion resistant band 14. A fastening means 20 such as a bolt, screw, etc. is inserted into the fastener engaging side 360 aperture 344 and is received in the cabinet 18 to couple the CRT 10 to the cabinet 18 in an off axis plane between the Z-axis and Y-axis of the CRT 10.

Advantageously, the first, second, and third embodiments of the mounting lugs 116, 216, 316 will couple an implosion resistant CRT 10 to a cabinet 18 in a direction other than parallel to the Z-axis to minimize microphonic coupling and vibration of the CRT 10.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A cathode ray tube comprising:
   an evacuated envelope having a substantially rectangular faceplate panel oriented to substantially lie in an X-Y plane boarded by an X-axis and a Y-axis, and orthogonal to a Z-axis, a sidewall joined to a funnel and an implosion resistant band surrounding at least a portion of the sidewall and in contact therewith;
   a plurality of mounting lugs having a base portion in contact with the implosion resistant band, an adjoining portion extending substantially perpendicular to the base portion and parallel to the X-Y plane, and a mounting portion having a cabinet engaging side extending from the adjoining portion at an angle to the X-Y plane; and
   the mounting portion having an aperture passing through the cabinet engaging side for receiving a fastener which is misaligned with the Z-axis.

2. The cathode ray tube of claim 1, wherein the mounting portion is positioned substantially perpendicular to the adjoining portion.

3. The cathode ray tube of claim 1, wherein the mounting portion is positioned at an acute angle in respect to the adjoining portion.

4. The cathode ray tube of claim 1, wherein the base portion is welded to the surface of the implosion resistant band.

5. The cathode ray tube of claim 1, wherein the adjoining portion has a first section and a second section, the second section forming a surface having complementary angled ends.

6. The cathode ray tube of claim 1, wherein the base portion is attached to the implosion resistant band.

7. A video display assembly having a plurality of speakers mounted in a cabinet to cause microphonic vibrations along a vibration axis, and including a cathode ray tube having an implosion resistant band surrounding at least a portion thereof, the video display assembly comprising:

a plurality of mounting lugs each having a base portion attached to the implosion resistant band, an adjoining portion extending substantially perpendicular to the base portion, and a mounting portion extending from the adjoining portion, the mounting portion having an aperture for receiving a fastener for coupling the mounting portion to the cabinet such that the fastener is misaligned with the vibration axis.

8. The assembly of claim 7, wherein the mounting portion is positioned substantially perpendicular to the adjoining portion.

9. The assembly of claim 7, wherein the mounting portion is positioned at an acute angle in respect to the adjoining portion.

10. The assembly of claim 7, wherein the base portion is welded to the surface of the implosion resistant band.

11. The assembly of claim 7, wherein the adjoining portion has a first section and a second section, the second section forming a surface having complementary angled ends.

\* \* \* \* \*